United States Patent [19]

Veronesi

[11] Patent Number: 4,955,787
[45] Date of Patent: Sep. 11, 1990

[54] ASSEMBLY FOR FACILITATING INSERVICE INSPECTION OF A REACTOR COOLANT PUMP ROTOR

[75] Inventor: Luciano Veronesi, O'Hara Township, Allegheny County, Pa.

[73] Assignee: Westinghouse Electric Corp., Pittsburgh, Pa.

[21] Appl. No.: 364,953

[22] Filed: Jun. 12, 1989

[51] Int. Cl.⁵ .............................................. B01D 25/00
[52] U.S. Cl. ...................................... 415/118; 416/63
[58] Field of Search ............... 415/118, 201, 126, 129, 415/132, 133, 170.01, 913; 417/63, 423.7

[56] References Cited

U.S. PATENT DOCUMENTS

| | | | |
|---|---|---|---|
| 2,972,310 | 2/1961 | Akermann | 103/87 |
| 3,491,695 | 1/1970 | Blum | 103/25 |
| 3,936,217 | 2/1976 | Travaglini et al. | 415/118 |
| 3,989,408 | 11/1976 | Jaegtnes | 415/118 |
| 4,087,204 | 5/1978 | Niedermeyer | 417/2 |
| 4,406,580 | 9/1983 | Baran, Jr. | 415/201 |
| 4,591,477 | 5/1986 | Rettew | 376/204 |

FOREIGN PATENT DOCUMENTS 0118578  1/1984  Japan ...................................... 417/63

Primary Examiner—Robert E. Garrett
Assistant Examiner—Hoang Nguyen
Attorney, Agent, or Firm—J. C. Spadacene

[57] ABSTRACT

A reactor coolant pump has an outer casing with an internal cavity holding a coolant and a rotor rotatably mounted in the cavity within the coolant. An assembly for permitting inservice inspection of the pump rotor without first draining the coolant from the casing cavity is attached to an end of the pump. A cylindrical bore is defined through the casing in axial alignment with an end of pump rotor and opening into the internal cavity. An extension attached on the rotor end and rotatable therewith has a cylindrical coupler member extending into the bore. An outer end of the coupler member has an element configured to receive a tool for performance of inservice rotor inspection. A hollow cylindrical member is disposed in the bore and surrounds the coupler member. The cylindrical member is slidably movable relative to the coupler member along the bore between a retracted position wherein the cylindrical member is stored for normal pump operation and an extended position wherein the cylindrical member is extended for permitting inservice rotor inspection. A cover member is detachably and sealably attached to the casing across the bore for closing the bore and retaining the cylindrical member at its retracted position for normal pump operation. Upon detachment of the cover member, the cylindrical member can be extended to permit inservice rotor inspection.

19 Claims, 5 Drawing Sheets

ASSEMBLY FOR FACILITATING INSERVICE INSPECTION OF A REACTOR COOLANT PUMP ROTOR

BACKGROUND OF THE INVENTION

1. Field of the Invention

The present invention relates generally to nuclear reactor coolant system pumps and, more particularly, is concerned with an assembly for facilitating inservice inspection of a reactor coolant pump rotor.

2. Description of the Prior Art

Improvements in safety, power generation cost, reliability and maintainability are the goals of a new generation of pressurized water nuclear reactors. An innovative reactor coolant system planned for use in the new generation PWR provides improvements in all of these areas while employing proven components in a unique compact configuration. One component employed by the reactor coolant system is a canned motor pump. Two canned motor pumps are used in each of the two coolant loops of the reactor coolant system. The pump casing of the canned motor pump is attached directly to the bottom of the channel head of the steam generator in the reactor coolant system. This configuration effectively combines the two components into a single structure.

The advantages of this configuration are significant. The canned motor pump has a demonstrated record of high reliability and an inherently simplified auxiliary fluid system. This pump further diminishes the potential risk for small loss-of-coolant accident (LOCA) because shaft seals are not used. Further, the close coupling of the pump and the steam generator eliminates a piping leg, improves loop pressure drop, simplifies the support system, and reduces potential for core uncovery during small LOCA.

A preventive maintenance program has been established for the canned motor pumps. This program should be performed between major inspections to verify the integrity of the pumps, prevent premature failure of the component and minimize plant down time. A mechanical inspection, scheduled to be performed at each refueling, consists of tests of breakaway torque (to confirm that the pump rotor spins or rotates freely and no rubs exist) and axial end play (check for excessive thrust bearing wear).

However, the hermetically-sealed canned motor pump is mounted to the bottom of the steam generator channel head in an inverted position where the canned motor stator flange of the pump is located well below the reactor vessel flange. Due to this arrangement, the water level in the refueling canal during refueling operations is approximately 45 feet above the bottom of the canned motor pump, making it impossible to physically reach the pump rotor through an inspection port without draining the pump and the system.

It is highly desirable to perform the aforementioned mechanical inspection without draining the system, without disassembling the pumps and without interfering with the critical path. Also, the breakaway torque test can be performed with less possibility of damage if the thrust and radial bearing are water lubricated rather than in the dry condition. Further, to minimize the impact of the canned motor pump mechanical inspection on plant availability, it is desirable that the inspection be performed during plant schedule outage for refueling notwithstanding the considerable distance of the pump below water level.

Consequently, there is a need for an approach to inservice pump inspection which permits performance of the pump rotor inspection during plant refueling and while the pump is submerged deep in water.

SUMMARY OF THE INVENTION

The present invention provides an assembly for facilitating inservice reactor coolant pump rotor inspection designed to satisfy the aforementioned needs. The apparatus of the present invention permits inservice inspection of the pump rotor by measurement of rotor breakaway torque and axial end play without the necessity of first draining the pump.

Accordingly, the present invention is directed to an inservice rotor inspection assembly which comprises: (a) means defining a cylindrical bore through the pump casing in axial alignment with an end of the pump rotor; (b) an extension attached on the rotor end and rotatable therewith, the extension including a cylindrical coupler member extending into the bore and having an outer end with an element configured to receive a tool for performance of inservice rotor inspection; (c) a hollow cylindrical member disposed in the bore and surrounding the coupler member, the cylindrical member being slidably movable relative to the coupler member along the bore between a retracted position wherein the cylindrical member is stored for normal pump operation and an extended position wherein the cylindrical member is extended for permitting inservice rotor inspection; and (d) a cover member sealably attached to the casing across the bore for closing the bore and retaining the cylindrical member at its retracted position for normal pump operation, the cover member being detachable from the casing for opening the bore and allowing movement of the cylindrical member to its extended position to permit inservice rotor inspection.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
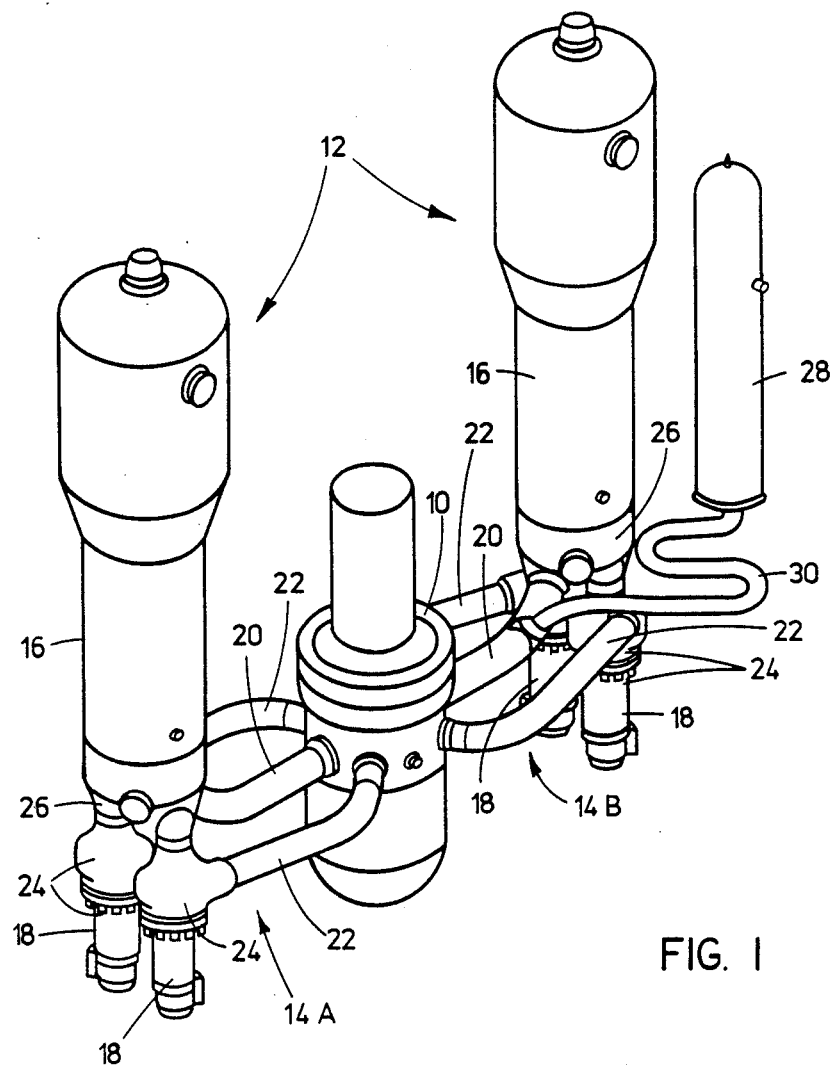
FIG. 1 is a perspective view of a nuclear reactor core and coolant system connected thereto having reactor coolant pumps with which is employed the inservice rotor inspection assembly of the present invention.

Referring now to the drawings, and particularly to FIG. 1, there is shown a nuclear reactor core vessel 10 and a coolant system 12 connected thereto. The reactor coolant system 12 includes two coolant loops, generally indicated by the numerals 14A and 14B. Each of the coolant loops 14A, 14B includes a single steam generator 16, a pair of high inertia canned motor pumps 18, a single hot leg pipe 20, and a pair of cold leg pipes 22.

The pair of pumps 18 in each coolant loop 14A, 14B are hermetically sealed and mounted in inverted positions to the one steam generator 16 in the respective coolant loop. Each pump 18 has an outer casing 24 which is attached, such as by welding, directly to the bottom of a channel head 26 of the steam generator 16 so as to effectively combine the two components into a single structure.

The hot leg pipes 20 extend between and interconnect the reactor vessel 10 and the respective stream generators 16 for routing high temperature reactor coolant from the vessel 10 to the steam generators 16. The cold leg pipes 22 extend between and interconnect the pumps 18 and the reactor vessel 10 for routing lower temperature reactor coolant from the steam generators 16 via the pumps 18 back to the reactor vessel 10. Further, a pressurizer tank 28 is connected by a surge line 30 to one of the hot leg pipes 20.

Figure 2:
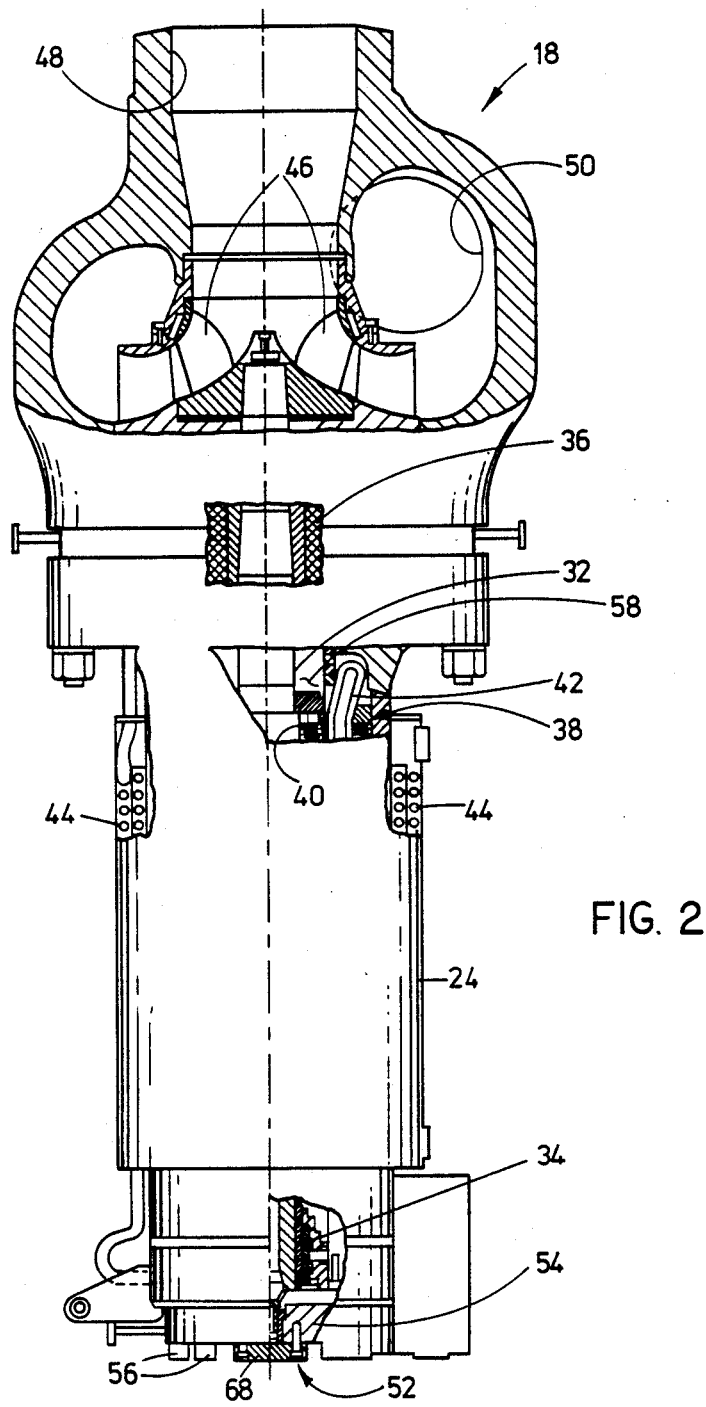
FIG. 2 is an enlarged elevational view, with portions broken away and sectioned, of one of the reactor coolant pumps of the coolant system.

Referring to FIG. 2, there is illustrated in greater detail one of the reactor coolant pumps 18. The pump 18 has a central axially extending rotor 32 rotatably mounted at its lower end by a pivot pad bearing 34 and at its upper end by a pivoted pad and thrust bearing combination 36. A canned motor 38 is located along the pump rotor 32 between the lower and upper bearings 34, 36. The motor 38 includes a rotor section 40 mounted for rotation on the pump rotor 32 and a stator 42 stationarily mounted about the rotor section 40. An annular cooling water jacket 44 surrounds the motor 38. Cooling coils (not shown) are also provided adjacent the upper thrust bearing 36 for cooling the same.

Also, at the upper end of the pump rotor 32 is mounted an impeller 46 which rotates with the rotor 32 and draws water axially through a central inlet nozzle 48 in the upper end of the pump casing 24 from the steam generator 16 and discharges the water tangentially through an outlet nozzle 50 in the pump casing 24 to the respective one of the cold leg pipes 22. In such manner, operation of the pumps 18 creates negative pressure at their inlet nozzles 48 which suctions or draws water from the reactor vessel 10 via the respective hot leg pipes 20 to and through the steam generators 16 and positive pressure at their outlet nozzles 50 which pumps water through the cold leg pipes 22 back to and through the reactor vessel 10.

Inservice Pump Rotor Inspection Assembly of Present Invention

A mechanical inspection of the pumps 18 to verify the integrity of the pumps and prevent premature failure of their components to minimize plant down time is scheduled to be performed at each refueling. This inspection of each pump 18 includes a breakaway torque test to confirm that the pump rotor 32 spins freely and no rubs exist, and an axial end play test to check for excessive thrust bearing wear. As seen in FIGS. 3-7, an inservice pump rotor inspection assembly 52 is provided which permits these inspections to be performed without draining the coolant system and without disassembling the pumps 18.

The pump 18 is hermetically sealed at its lower end by a closure member in the form of a stator cap or flange 54 attached to the pump outer casing 24 by a plurality of bolts 56. The construction of the pump 18 is such that its rotor 32 rotates in a central cavity 58 which contains a small head of reactor coolant water extending downward along the rotor to the stator flange 54. Because of the location of the inverted pump 18 on the bottom of the steam generator 16, the stator flange 54 is located well below the water level in the reactor vessel 10. Thus, in absence of the inservice pump rotor inspection assembly 52 of the present invention, the pump rotor 32 could not be inspected by removal of the stator flange 54 without first draining the coolant system 12. This is especially the case when carrying out the inspection during the refueling operations, since the water level in the refueling canal is approximately forty-five feet above the bottom of the pump 18. The inservice pump rotor inspection assembly 52 is designed to accommodate the presence of coolant water in the rotor cavity 58 above the stator flange 54.

Figure 3:
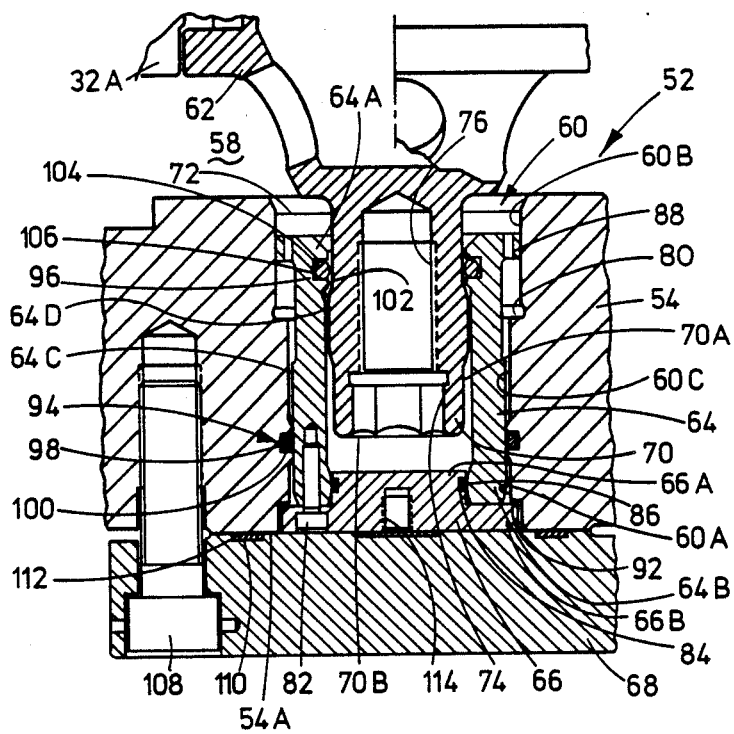
FIG. 3 is an enlarged axial sectional view of the inservice rotor inspection assembly of the present invention incorporated on the bottom of the pump of FIG. 2, showing components of the assembly in an inoperative condition.

Referring first to FIG. 3, the inservice inspection assembly 52 includes an inspection port in the form of a cylindrical bore 60 defined through the stator flange 54 in axial alignment with and disposed below a lower end 32A of the rotor 32. The cylindrical bore 60 has a lower open end 60A communicating with the exterior of stator flange 54 and an upper open end 60B communicating with the lower end of the central cavity 58 of the pump. The inspection assembly 52 further includes an extension 62 attached on the lower end 32A of the rotor 32, a hollow cylindrical member 64, an end cap 66 and a cover member 68.

Figure 6:
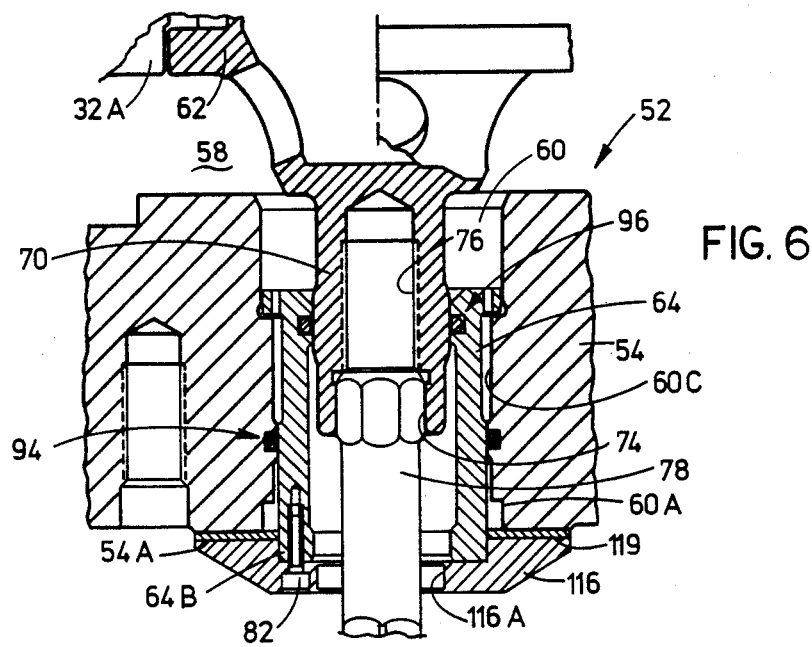
Figure 7:
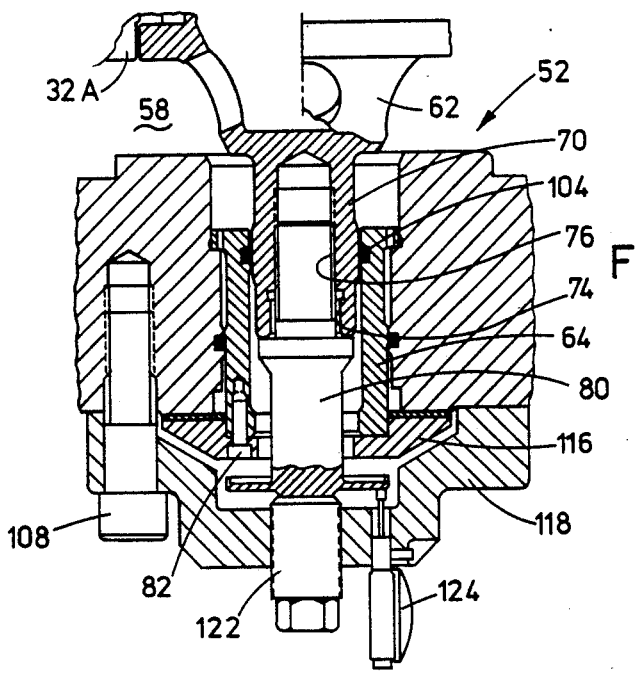

More particularly, the rotor extension 62 of the inspection assembly 52 includes a cylindrical coupler member 70 extending into the bore 60 of the stator flange 54 through the upper open end 60B of the bore 60 from the lower end of the cavity 58. The coupler member 70 is spaced radially inward at its exterior surface 70A from a cylindrical wall surface 60C of the bore 60 so as to define an annular space 72 between the respective surfaces 70A, 60C. The coupler member 70 has formed therein an outer socket 74 and an inner internally threaded bore 76 merging and extending axially upwardly from the outer socket 74. The outer socket 74 and inner threaded bore 76 of the coupler member 70 open at the lower terminal end 70B of the coupler member 70 and face toward the lower open end 60A of the bore 60 for receiving therethrough complementarily-configured ends of respective tools 78, 80, as seen in FIGS. 6 and 7, used for making breakaway rotor torque and rotor axial play measurements during the performance of the inservice rotor inspection.

The hollow cylindrical member 64 of the inspection assembly 52 is open at its opposite upper and lower ends 64A, 64B. The cylindrical member 64 is disposed in the bore 60 within the annular space 72 between the coupler member exterior surface 70A and bore wall surface 60C, and is slidably movable relative to the axially stationary coupler member 70 and the stator flange 54 along the respective surfaces 70A, 60C thereof. The end cap 66 is releasably attached to the lower open end 64B of the cylindrical member 64 respective by a plurality of fasteners 82 (only one of which is shown in FIG. 3). The end cap 66 has an inner portion 66A which fits into the lower end 64B of the cylindrical member 64 and has an annular recess 84 which seats an O-ring 86 for providing a seal with the cylindrical member. The end cap 66 has an outer ledge 66B thereon which underlies the lower end 64B of the cylindrical member 64.

Figure 4:
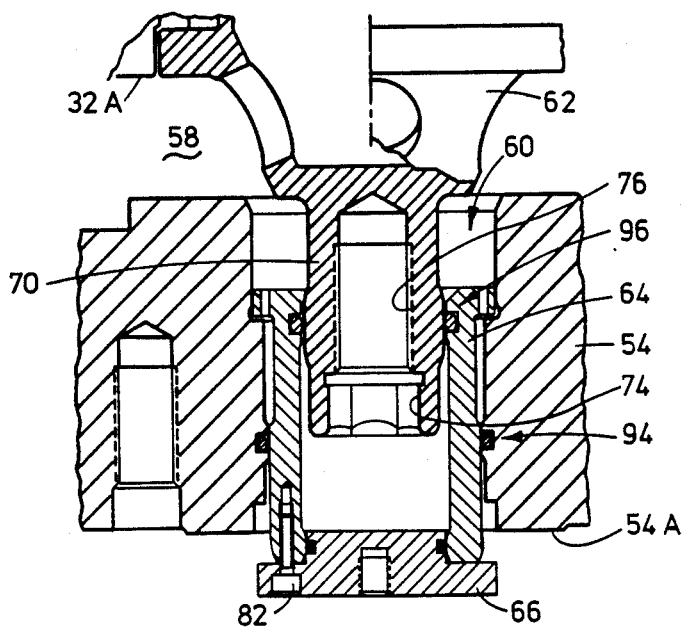
FIGS. 4-7 are views similar to that of FIG. 3 but showing components of the assembly converted to an operative condition for facilitating performance of torque and axial end play inspections of the pump rotor.
Figure 5:
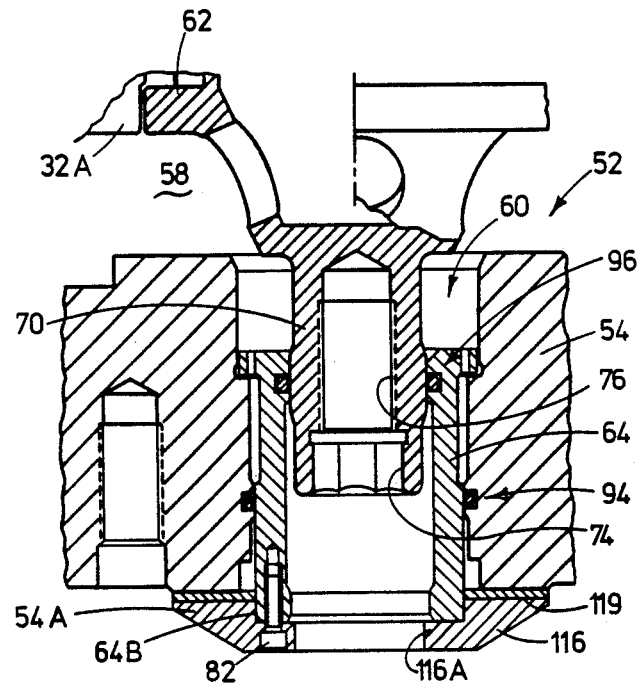

The upper and lower limits of reciprocal sliding movement of the cylindrical member 64 within the annular space 72 and relative to the coupler member 70 and the stator flange 54 between an upper retracted position, as seen in FIG. 3, and a lower extended position, as seen in FIG. 4, is determined by first and second pairs of stop elements defined respectively at the upper and lower ends 64A, 64B of the cylindrical member 64 and at axially spaced locations on the wall surface 60C of the bore 60. More particularly, the stop elements of the first pair are in the form of the ledge 66B on the end cap 66 at the lower end 64B of the cylindrical member 64 and a radially projecting annular ledge 88 defined at the upper end 64A of the cylindrical member 64. The stop elements of the second pair are in the form of oppositely upward and downward facing upper and lower annular shoulders 90, 92 defined by radially offset portions of the bore wall surface 60C at axially spaced locations therealong. When the cylindrical member 64 is at its upper retracted position of FIG. 3, it is stored for normal pump operation, whereas when at its lower extended position the cylindrical member 64 is extended and setup for permitting inservice rotor inspection.

The inspection assembly 52 further includes external and internal seals 94, 96 being provided respectively at external and internal surfaces 64C, 64D of the cylindrical member 64. The external seal 94 at the external surface 64C of the cylindrical member 64 is composed by an O-ring seal 98 supported in an annular groove 100 formed in the bore wall surface 60C. The O-ring seal 98 surrounds and engages the external surface 64C of the cylindrical member 64 when the latter is at both its upper retracted position of FIG. 3 and its lower extended position of FIG. 4 and also as the cylindrical member 64 moves between its positions. The external seal 94 is thus continuously present between the external surface 64C of the cylindrical member 64 and the bore wall surface 60C and effective to prevent escape of coolant from the cavity 58 along the external surface 64C of the cylindrical member 64.

The internal seal 96 at the internal surface 64D of the cylindrical member 64 is composed by an annular raised land 102 formed on the exterior surface 70A of the coupler member 70 and an O-ring seal 104 supported in an annular groove 106 in the internal surface 64D of the cylindrical member 64. The O-ring seal 104 surrounds and engages the annular land 102 on the exterior surface 70A of the coupler member 70 when only the cylindrical member 64 is at its lower extended position of FIG. 4. Thus, the internal seal 96 is not continuously present between the internal surface 64D of the cylindrical member 64 and the exterior surface 70A of the coupler member 70. The internal seal 96 is only present and effective to prevent escape of coolant from the cavity 58 along the internal surface 64D of the cylindrical member 64 when the latter is at its lower extended position.

In view that the internal seal 96 at the internal surface 64D of the cylindrical member 64 is only effective when the cylindrical member 64 is at its lower position of FIG. 4, thus when the cylindrical member 64 is at its upper position of FIG. 3 coolant is permitted to pass by the internal O-ring seal 104 from the cavity 58 to below the coupler member 70. As mentioned earlier, the end cap 66 of the inspection assembly 52 is normally sealably attached to the lower end 64B of the cylindrical member 64. The end cap 66 thus closes the lower open end 64B of the cylindrical member 64 prevents escape of coolant from the bore 60 through the cylindrical member lower open end 64C when the cylindrical member is disposed at its retracted position during normal pump operation and further as cylindrical member 64 is moved from its retracted to extended position in converting the inspection assembly 52 for performance of inservice rotor inspection procedures. However, once the cylindrical member 64 has reached its lower extended position of FIG. 4, removal of the end cap 66 does result in escape of the small quantity of coolant which was occupying the interior volume of the cylindrical member 64 below coupler member 70. The amount of coolant lost is minimal, for instance, one half of a cup of primary coolant, in view that the establishment of the interior seal 96 when the cylindrical member 64 has moved to its lower position which prevents any additional flow of coolant past the interior O-ring seal 104. In converting the inspection assembly 52 for performance of inservice rotor inspection procedures, the end cap 66 has to be removed once the cylindrical member 64 has reached its extended position so that access is provided for extension of measuring tools 78, 80 through the lower end 60A of the bore 60 to the socket 74 and threaded bore 76 in the coupler member 70.

As seen in FIG. 3, the cover member 68 of the inspection assembly 52 is normally disposed across the lower open end 60A of the bore 60 so as to close the inspection port. In particular, the cover member 68 in the shape of a cylindrical plate is sealably and detachably attached to the stator flange 54 by a plurality of bolts 108. The cover member 68 has an annular recess 110 in its upper surface 68A within which is seated an annular flexible gasket or seal 112 which provides the seal between the stator flange 54 and cover member 68. With the cover member 68 so attached to the stator member 54 during normal pump operation, the cylindrical member 64 is retained at its upper retracted position.

Once the cover member 68 has been detached from the stator flange 54 as is the case in FIG. 4, then the cylindrical member 64 can move to its lower extended position. There is a static head of coolant water in the refueling canal of the reactor vessel 10 providing approximately 150-pound downward force over the cylindrical member 64 forcing it downward as soon as the cover member 68 is removed. Thus, the cylindrical member 64 should move downward unaided. However, should the cylindrical member 64 need assistance in moving to the lower position, an internally-threaded hole 114 is tapped in the external face of the end cap 66 for temporary attachment of a tool to pull the cylindrical member 64.

The inspection assembly 52 further includes an annular retainer member 116 and a mounting flange 118. The retainer member 116 of the inspection assembly 52 is provided for mounting to the stator flange 54 about the lower open end 60A of the bore 60 after removal of the cover member 68, relocation of the cylindrical member 64 to its lower extended position, and removal of the end cap 66. The retainer member 116 has a central opening 116A which permits insertion of the inspection tools 78, 80 and is attached to the lower end 64B of the cylindrical member 64 by the same fasteners 82 used to attach the end cap 66. The purpose for using the retainer member 116 is twofold. First, the retainer member 116 serves to cover and protect from scratching the seal surface 54A on the stator flange 54 surrounding the bore 60. An annular gasket 119 is bonded to the retainer member 116 for this purpose. Second, the retainer member 116 retains or holds the cylindrical member 64 at its lower extended position so that the latter cannot be inadvertently lifted upward causing removal of the internal seal 96 and passage of more coolant out the inspection port or bore 60 as inservice rotor inspection procedures are being performed.

Figure 8:
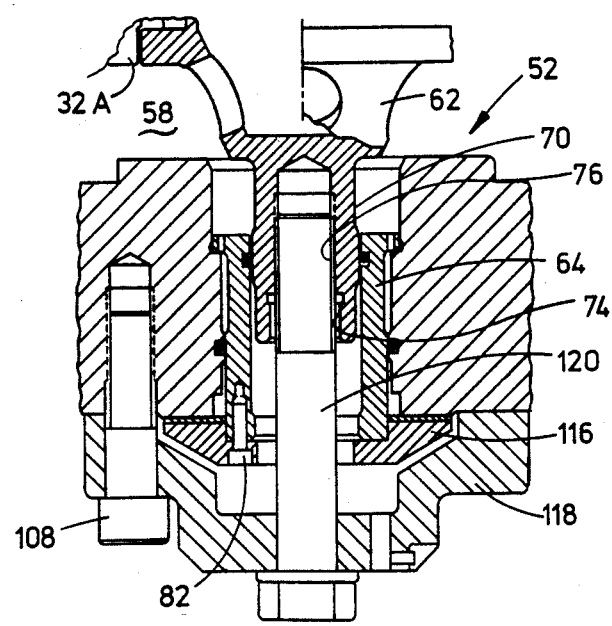
FIG. 8 is a view similar to that of FIG. 4 but showing components of the assembly disposed in a condition for pump shipment.

The mounting flange 118 of the inspection assembly 52 is provided for mounting to the stator flange 54 about and overlying the retainer member 116 after the latter has already been mounted to the stator flange 54. As seen in FIGS. 7 and 8, the mounting flange 118 is attached to the stator flange 54 by the same bolts 108 used to attach the cover member 68. The flange member 118 is used for two different purposes at two different times. First, as shown in FIG. 7, the mounting flange 118 is employed during performance of inservice rotor inspection procedures to mount the inspection tool 80 which is used to measure rotor end play. Second, as seen in FIG. 8, the mounting flange 118 is employed during shipment of the pump 18 to mount a screw 120 which is threaded into the inner threaded bore 76 of the coupler member 70 for sealing the pump cavity 58 and holding the rotor 32 stationary.

Briefly, the inservice inspection measurement of rotor breakaway torque is carried out by use of the tool 78 in FIG. 6 which is a torque wrench having an adapter for insertion into the hexagonal outer socket 74 in the coupler member 70. The expected breakaway torque for the pump 10 in the wet condition is about 1270 ft-lb and the extra torque generated by the friction of the internal O-ring seal 104 over the coupler member 70 is less than one ft-lb which is negligible. Inservice inspection measurement of rotor axial end play is carried out by use of the tool 80 in FIG. 7 which is a jacking screw 122 mounted to the mounting flange 118 and having an end adapter screwed into the threaded inner bore 76 in the coupler member 70. By rotating the jacking screw 122, the axial rotor end play can be measured by the dial indicator 124.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a pump having an outer casing and a rotor rotatably mounted in said casing, an assembly for facilitating inservice inspection of said pump rotor, comprising:
   (a) means defining a cylindrical bore through said casing in axial alignment with an end of said pump rotor;
   (b) an extension on said rotor end and rotatable therewith, said extension including a cylindrical coupler member extending into said bore and having an outer end with an element configured to receive a tool for performance of inservice rotor inspection;
   (c) a hollow cylindrical member disposed in said bore and surrounding said coupler member, said cylindrical member being slidably movable relative to said coupler member along said bore between a retracted position wherein said cylindrical member is stored for normal pump operation and an extended position wherein said cylindrical member is extended for permitting inservice rotor inspection; and
   (d) a cover member sealably attached to said casing across said bore for closing said bore and retaining said cylindrical member at its retracted position for normal pump operation, said cover member being detachable from said casing for opening said bore and allowing movement of the cylindrical member to its extended position to permit inservice rotor inspection.

2. The assembly as recited in claim 1, further comprising:
   means for forming an external seal between an external surface of said cylindrical member and a wall surface of said bore at both said retracted and extended positions of said cylindrical member and as said cylindrical member moves between said positions.

3. The assembly as recited in claim 2, wherein said external seal forming means is an O-ring seal supported in an annular groove in said bore wall surface surrounding and engaged with said external surface of said cylindrical member.

4. The assembly as recited in claim 1, further comprising:
   means for forming an internal seal between an internal surface of said cylindrical member and an exterior surface of said coupler member when said cylindrical member is at its extended position.

5. The assembly as recited in claim 4, wherein said internal seal forming means is an annular raised land formed on said exterior surface of said coupler member and an O-ring seal supported in an annular groove in said internal surface of said cylindrical member surrounding and engaged with said annular land on said exterior surface of said coupler member when said cylindrical member is at its extended position.

6. The assembly as recited in claim 1, further comprising:
   an end cap releasably and sealably attached to said cylindrical member at an outer open end thereof for closing the same when said cylindrical member is disposed at its retracted position and as said cylindrical member is moved from its retracted to extended position, said end cap being removable from said cylindrical member when the latter is at its extended position for providing access through said open end of said cylindrical member to said element in said outer end of said coupler member.

7. The assembly as recited in claim 6, further comprising:
an annular retainer member mountable to said pump casing about said bore therein and attachable to said open end of said cylindrical member, after detachment of said cover member from said casing and removal of said end cap from said cylindrical member open end, for retaining said cylindrical member at its extended position.

8. The assembly as recited in claim 7, further comprising:
an inspection device mounting flange mountable to said pump casing about said annular retainer member after said annular retainer member is mounted to said casing.

9. The assembly as recited in claim 1, further comprising:
first and second pairs of stop elements defined respectively at opposite ends of said cylindrical member and at axially spaced locations on a wall surface of said bore for defining said retracted and extended positions of said cylindrical member.

10. The assembly as recited in claim 9, wherein said stop elements of said first pair are radially projecting annular ledges defined at said opposite ends of said cylindrical member.

11. The assembly as recited in claim 9, wherein said stop elements of said second pair are oppositely facing annular shoulders defined at said axially spaced locations on said wall surface of said bore.

12. In a reactor coolant pump having an outer casing defining an internal cavity for holding a coolant, a rotor rotatably mounted in generally upright relation to said casing through said cavity and within the coolant therein, and a closure member attached to a lower end of said casing so as to close a lower end of said cavity and prevent escape of the coolant therefrom, an assembly for facilitating inservice inspection of said pump rotor without emptying the coolant from said pump cavity, said assembly comprising:
(a) means defining a cylindrical bore through said closure member of said pump in axial alignment with and disposed below a lower end of said rotor and having a lower end communicating with the exterior of said casing and an upper end communicating with said lower end of said cavity;
(b) an extension on said lower end of said rotor and including a cylindrical coupler member extending into said closure member bore through said upper end thereof from said lower end of said cavity and being spaced radially inward at its exterior surface from a cylindrical wall surface of said bore so as to define an annular space between said surfaces, said coupler member having an element facing toward said lower end of said bore and being configured to receive an inspection tool inserted through said lower end of said bore for performance of inservice rotor inspection;
(c) a hollow cylindrical member open at its opposite upper and lower ends and disposed in said closure member bore within said annular space between said coupler member exterior surface and closure member bore wall surface, said cylindrical member being slidably movable relative to said coupler member and said closure member along said surfaces thereof between a retracted position wherein said cylindrical member is stored for normal pump operation and an extended position wherein said cylindrical member is extended for permitting inservice rotor inspection;
(d) means for forming an external seal between an external surface of said cylindrical member and said bore wall surface when said cylindrical member is at both its retracted and extended positions and as said cylindrical member moves between said positions for preventing escape of coolant from said cavity along said external surface of said cylindrical member;
(e) means for forming an internal seal between an internal surface of said cylindrical member and said exterior surface of said coupler member when said cylindrical member at its extended position to prevent escape of fluid from said cavity along said internal surface of said cylindrical member;
(f) an end cap releasably and sealably attached to said cylindrical member at said lower end thereof for closing said lower open end of said cylindrical member to prevent escape of fluid from said cavity through said cylindrical member lower open end when said cylindrical member is disposed at its retracted position and as said cylindrical member is moved from its retracted to extended position, said end cap being removable when said cylindrical member is at its extended position for providing access through said lower end of said bore to said element in said lower end of said coupler member; and
(g) a cover member sealably and detachably attached to said pump closure member across said lower end of said bore for closing said bore and retaining said cylindrical member at its retracted position.

13. The assembly as recited in claim 12, wherein said external seal forming means is an O-ring seal supported in an annular groove in said bore wall surface surrounding and engaged with said external surface of said cylindrical member.

14. The assembly as recited in claim 12, wherein said internal seal forminq means is an annular raised land formed on said exterior surface of said coupler member and an O-ring seal supported in an annular groove in said internal surface of said cylindrical member surrounding and engaged with said annular land on said exterior surface of said coupler member when said cylindrical member is at its extended position.

15. The assembly as recited in claim 12, further comprising:
an annular retainer member mountable to said pump closure member about said lower end of said bore therein and attachable to said lower end of said cylindrical member, after detachment of said cover member from said closure member and removal of said end cap from said cylindrical member lower end, for retaining said cylindrical member at its extended position.

16. The assembly as recited in claim 15, further comprising:
an inspection device mounting flange mountable to said pump closure member about said annular retainer member after said annular retainer member is mounted to said closure member.

17. The assembly as recited in claim 15, further comprising:
first and second pairs of stop elements defined respectively at said opposite upper and lower ends of said cylindrical member and at axially spaced locations on said wall surface of said bore for defining said retracted and extended positions of said cylindrical member.

18. The assembly as recited in claim 17, wherein said stop elements of said first pair are radially projecting annular ledges defined at said opposite upper and lower ends of said cylindrical member.

19. The assembly as recited in claim 17, wherein said stop elements of said second pair are oppositely facing annular shoulders defined at said axially spaced locations on said wall surface of said bore.

* * * * *